United States Patent
Chang et al.

(10) Patent No.: US 11,467,690 B1
(45) Date of Patent: Oct. 11, 2022

(54) TOUCH-AND-DISPLAY DEVICE OPERATED WITH ACTIVE STYLUS

(71) Applicant: HIMAX TECHNOLOGIES LIMITED, Tainan (TW)

(72) Inventors: Chung-Wen Chang, Tainan (TW);
Fong Wei Yang, Tainan (TW);
Ming-Kai Cheng, Tainan (TW);
Wen-Sen Su, Tainan (TW); Shen-Feng Tai, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 0 days.

(21) Appl. No.: 17/449,453

(22) Filed: Sep. 29, 2021

(51) Int. Cl.
*G06F 3/041* (2006.01)
*G06F 3/0354* (2013.01)

(52) U.S. Cl.
CPC ...... *G06F 3/04162* (2019.05); *G06F 3/03545* (2013.01)

(58) Field of Classification Search
CPC .................. G06F 3/04162; G06F 3/03545
See application file for complete search history.

(56) References Cited

U.S. PATENT DOCUMENTS

2020/0201505 A1* 6/2020 Jung ................. G06F 3/0414
2021/0055808 A1* 2/2021 Kato ................. G06F 3/046

\* cited by examiner

*Primary Examiner* — Lisa S Landis
(74) *Attorney, Agent, or Firm* — CKC & Partners Co., LLC

(57) ABSTRACT

A touch-and-display device operated with an active stylus is provided. A touch position is detected in a touch detection period. An uplink signal is transmitted and a downlink signal is detected in a stylus detection period. When the downlink signal is detected, it is determined if a distance between a stylus position and the touch position is less than or equal to a first predetermined distance. A stylus mode is not entered if the determination result is affirmative.

15 Claims, 7 Drawing Sheets

TOUCH-AND-DISPLAY DEVICE OPERATED WITH ACTIVE STYLUS

BACKGROUND

Field of Invention

The present disclosure relates to a touch-and-display device capable of avoiding false detection of a downlink signal.

Description of Related Art

Recently, a stylus has been widely used as a human interface device (HID) for smart phones and tablets. The stylus can be classified as a passive stylus and an active stylus. In the operation of a general active stylus, a touch screen sends an uplink signal to the active stylus, and the active stylus transmits a downlink signal to the touch screen. However, the device may be connected to a noise source (e.g. a charger). If the noise is falsely detected as the downlink signal, operation errors will occur.

SUMMARY

Embodiments of the present disclosure provide a touch-and-display device operated with an active stylus. The touch-and-display device includes a touch-and-display panel and a circuit. The touch-and-display panel includes multiple sensing electrodes. The circuit is electrically connected to the sensing electrodes through multiple sensing lines. In a touch detection period, the circuit is configured to detect a touch position according to multiple first signals on the sensing lines. In a stylus detection period, the circuit is configured to transmit an uplink signal to the sensing electrodes and detect a downlink signal and a stylus position according to multiple second signals on the sensing lines. When the downlink signal is detected, the circuit is configured to determine if a distance between the stylus position and the touch position is less than or equal to a first predetermined distance. If the distance between the stylus position and the touch position is greater than the first predetermined distance, the circuit is configured to enter a stylus mode, in which the touch position is not detected in the stylus mode. If the distance between the stylus position and the touch position is less than or equal to the first predetermined distance, the circuit is configured not to enter the stylus mode.

In some embodiments, the circuit includes a demodulator, an analogy-to-digital converter, and a computing circuit. The demodulator is electrically connected to the sensing lines and configured to output multiple demodulated signals according to the second signals. The analogy-to-digital converter is electrically connected the demodulator and configured to output a stylus value corresponding to each of the sensing electrode according to the demodulated signals. The computing circuit is electrically connected to the analogy-to-digital converter and configured to calculate the stylus position according to the stylus values and determine if the stylus values are greater than a first threshold. If one of the stylus values is greater than the first threshold, the computing circuit is configured to determine that the downlink signal is detected.

In some embodiments, the computing circuit is configured to calculate weighting sum of positions of the sensing electrodes as the stylus position, and a weight of each of the sensing electrodes is proportional to the corresponding stylus.

In some embodiments, if the distance between the stylus position and the touch position is less than or equal to the first predetermined distance, the circuit is configured to determine if the stylus values are greater than a second threshold which is greater than the first threshold. If the stylus values are less than or equal to the second threshold, the circuit is configured to ignore the downlink signal and not enter the stylus mode.

In some embodiments, if one of the stylus values is greater than the second threshold, the circuit is configured to enter the stylus mode.

In some embodiments, if the stylus position is the same as the touch position, the circuit is configured not to enter the stylus mode.

In some embodiments, if the downlink signal is not detected for a predetermined time, the circuit is configured to end the stylus mode and re-detect the touch position.

In some embodiments, the touch-and-display device is connected to a charger.

From another aspect, embodiments of the present disclosure provide a sensing method of an active stylus for a touch-and-display device. The touch-and-display device includes multiple sensing electrodes. Multiple sensing lines are connected to the sensing electrodes respectively. The sensing method includes: in a touch detection period, detecting a touch position according to multiple first signals on the sensing lines; in a stylus detection period, transmitting an uplink signal to the sensing electrodes and detecting a downlink signal and a stylus position according to multiple second signals on the sensing lines; when the downlink signal is detected, determining if a distance between the stylus position and the touch position is less than or equal to a first predetermined distance; if the distance between the stylus position and the touch position is greater than the first predetermined distance, entering a stylus mode, in which the touch position is not detected in the stylus mode; and if the distance between the stylus position and the touch position is less than or equal to the first predetermined distance, not entering the stylus mode.

In some embodiments, the sensing method further includes: outputting, by a demodulator, multiple demodulated signals according to the second signals; outputting, by an analogy-to-digital converter, a stylus value corresponding to each of the sensing electrode according to the demodulated signals; calculating the stylus position according to the stylus values and determining if the stylus values are greater than a first threshold; and if one of the stylus values is greater than the first threshold, determining that the downlink signal is detected.

In some embodiments, the sensing method further includes: calculating a weighting sum of positions of the sensing electrodes as the stylus position in which a weight of each of the sensing electrodes is proportional to the corresponding stylus.

In some embodiments, the sensing method further includes: if the distance between the stylus position and the touch position is less than or equal to the first predetermined distance, determining if the stylus values are greater than a second threshold which is greater than the first threshold; and if the stylus values are less than or equal to the second threshold, ignoring the downlink signal and not entering the stylus mode.

In some embodiments, the sensing method further includes: if one of the stylus values is greater than the second threshold, entering the stylus mode.

In some embodiments, the sensing method further includes: if the stylus position is the same as the touch position, not entering the stylus mode.

In some embodiments, the sensing method further includes: if the downlink signal is not detected for a predetermined time, ending the stylus mode and re-detecting the touch position.

BRIEF DESCRIPTION OF THE DRAWINGS

The invention can be more fully understood by reading the following detailed description of the embodiment, with reference made to the accompanying drawings as follows.

DETAILED DESCRIPTION

Specific embodiments of the present invention are further described in detail below with reference to the accompanying drawings, however, the embodiments described are not intended to limit the present invention and it is not intended for the description of operation to limit the order of implementation. Moreover, any device with equivalent functions that is produced from a structure formed by a recombination of elements shall fall within the scope of the present invention. Additionally, the drawings are only illustrative and are not drawn to actual size.

The using of "first", "second", "third", etc. in the specification should be understood for identifying units or data described by the same terminology, but are not referred to particular order or sequence.

Figure 1A:
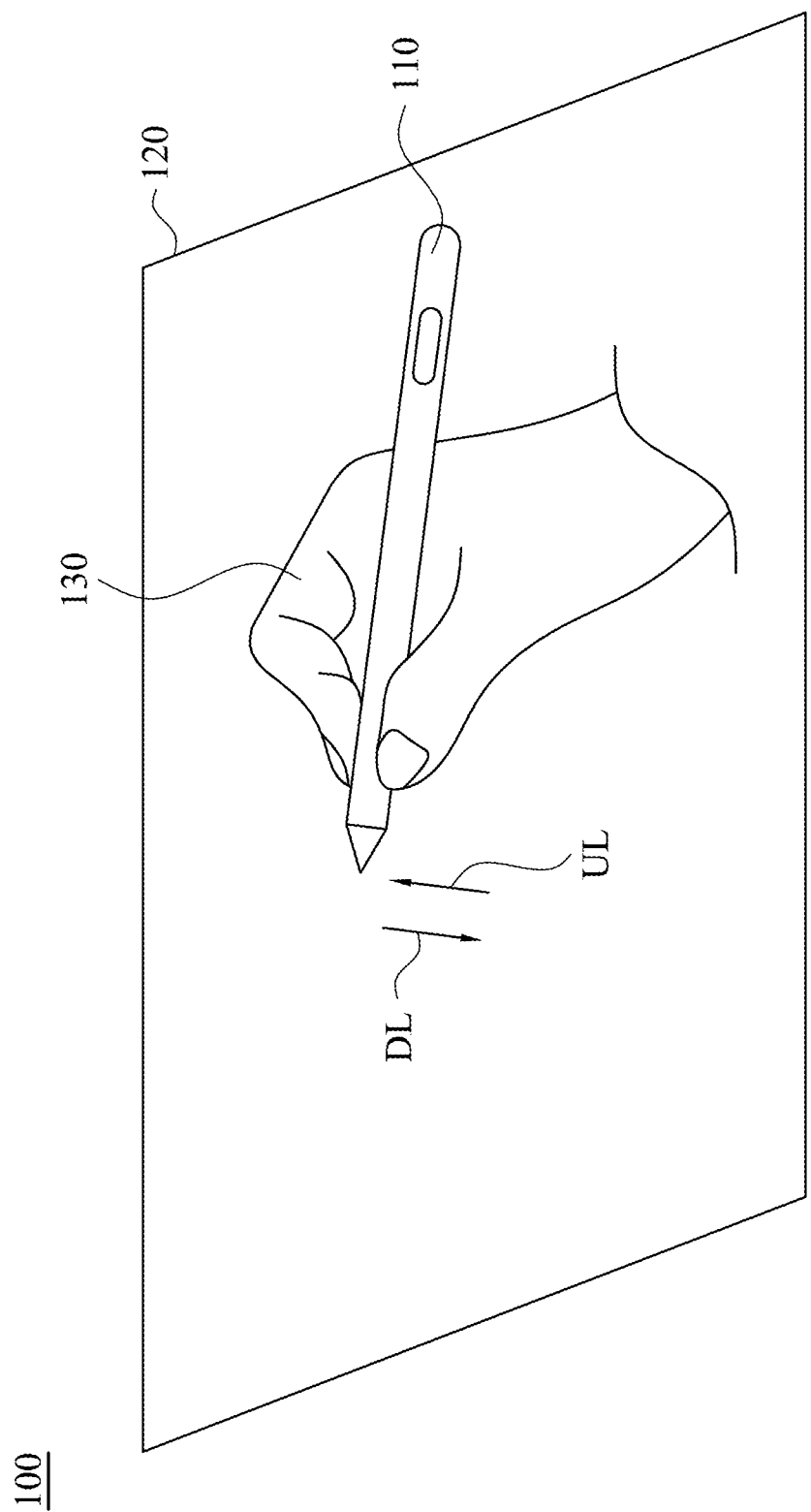
FIGS. 1A and 1B are diagrams illustrating usage scenario of a sensing system in accordance with some embodiments.
Figure 1B:
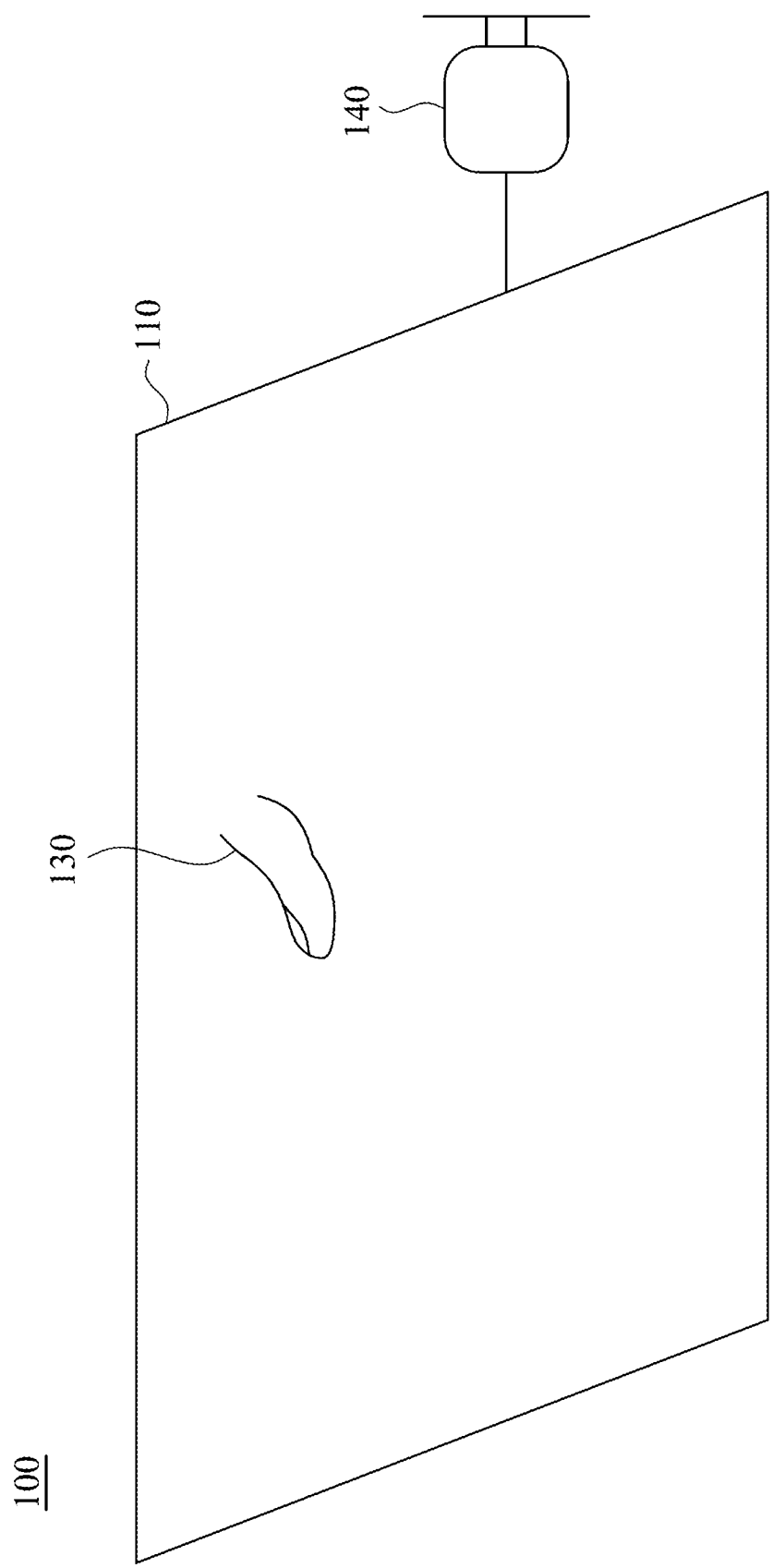

FIGS. 1A and 1B are diagrams illustrating usage scenario of a sensing system in accordance with some embodiments. Referring to FIG. 1A, sensing system 100 includes an active stylus 110 and a touch-and-display device 120. A user holds the active stylus 110 with his/her hand 130 to write or draw on the touch-and-display device 120. The touch-and-display device 120 provides functions of display and touch sensing simultaneously to perform some operations in respond to the moving track of the active stylus 110. The touch-and-display device 120 transmits an uplink signal UL to the active stylus 110. The active stylus 110 transmits a downlink signal DL to the touch-and-display device 120. In this situation, the touch-and-display device 120 enters an stylus mode in which the hand 130 is not detected because the user usually puts his/her hand 130 on the touch-and-display panel 201 when using the active stylus 110, but the hand 130 does not represent the operation the user intend to perform. For example, the hand 130 may touch an icon, but the user does not intend to activate the function of the icon.

In the situation of FIG. 1B, the user does not hold the active stylus and is sliding his/her finger on the touch-and-display device 120 while the touch-and-display device 120 is connected to a charger 140. The charger 140 may generate noises which may be falsely detected as the downlink signal DL. If the touch-and-display device 120 enters the stylus mode, it cannot detect the finger. To avoid the false detection, it is determined if a distance between a stylus position and a touch position is less than a predetermined distance. The downlink signal DL may be ignored if the determination result is affirmative.

Figure 2:
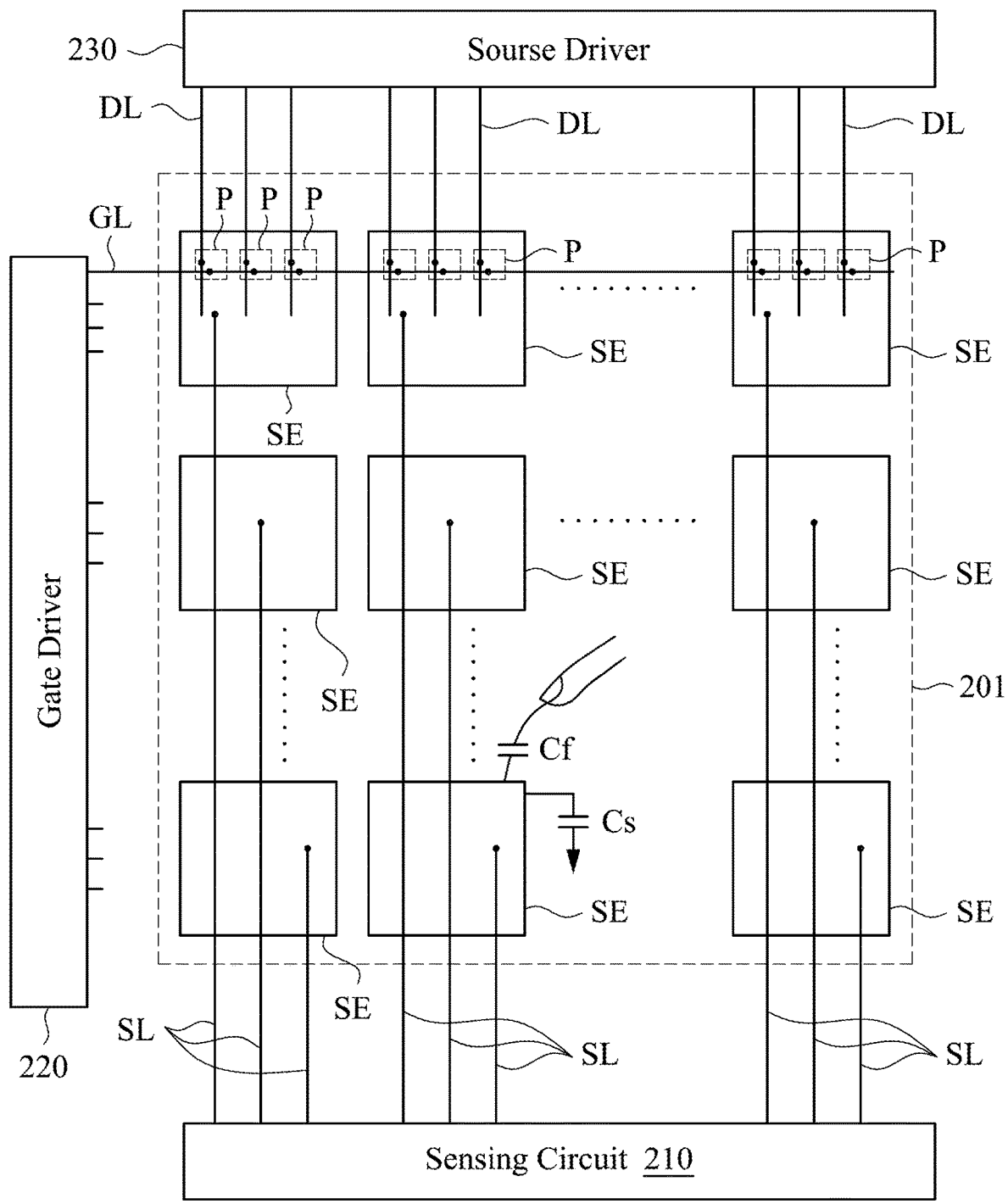
FIG. 2 is a schematic diagram of a touch-and-display device 120 in accordance with an embodiment.

FIG. 2 is a schematic diagram of a touch-and-display device 120 in accordance with an embodiment. Referring to FIG. 2, the touch-and-display device 120 includes a touch and display driver integration (TDDI) circuit and a touch-and-display panel 201. The TDDI circuit includes a sensing circuit 210, a gate driver 220, and a source driver 230 in a non-display area. It is illustrated in FIG. 2 that the source driver 230 is at the upper side, and the sensing circuit 210 is at the button side, but the source driver 230 and the sensing circuit 210 may be integrated in the same circuit in some embodiments. The touch-and-display panel 201 includes sensing lines SL, gate lines GL, and data lines DL. The sensing electrodes SE are electrically insulated with each other and electrically connected to the sensing circuit 210 through the sensing lines SL respectively. Each sensing electrode SE corresponds to multiple pixel structures P and serves as a common electrode of the corresponding pixel structure P. Each pixel structure P includes a thin film transistor (TFT) (not shown) and a pixel electrode (not shown). Each gate line GL is connected to the gate driver 220 and the gates of the TFTs of corresponding pixel structures P. Each data line DL is connected to the source driver 230 and the sources of the TFTs of corresponding pixel structures P. The drain of each TFT is connected to the corresponding pixel electrode. For simplification, not all circuits (e.g. time controller) are shown in FIG. 2, and the TDDI circuit may include other components.

In a display period, the gate driver 220 turns on the corresponding TFTs through the gate lines GL, and the source driver 230 transmits pixel data to the corresponding pixel electrodes through the data lines DL, and the sensing circuit 210 applies a common voltage to the sensing electrodes SE through the sensing lines SL. A voltage difference between the pixel electrode and the sensing electrode SE is configured to orient liquid crystal molecule to determine a brightness of a pixel. In other embodiments, the touch-and-display panel 201 may be an organic light emitting diode (OLED) panel or any other suit display panel.

In a touch sensing period, it is determined whether each sensing electrode SE is touched by a self-inductive capacitance sensing method. To be specific, a capacitor Cs is formed on each sensing electrode SE (only one capacitor Cs is shown in FIG. 2 for simplification). When a finger touches a sensing electrode SE, a capacitor Cf is formed between the finger and the touched sensing electrode SE such that the total capacitance of the touched sensing electrode SE changes. The sensing circuit 210 transmits a touch sensing signal to the sensing electrodes SE through the sensing lines SL. The touch sensing signal may have waveforms of square, triangle, sine or any suitable waveform, which is not limited in the invention. The quantity of the charges accumulated on the sensing electrodes SE reflects the capacitance thereof and corresponding signals are generated on the sensing lines SL. The sensing circuit 210 can determine which sensing electrode SE is touched and calculate a touch position based on the signals on the sensing lines SL. In other embodiments, a mutual-inductive capacitance sensing method may be adopted which is not limited in the disclosure.

Figure 3:
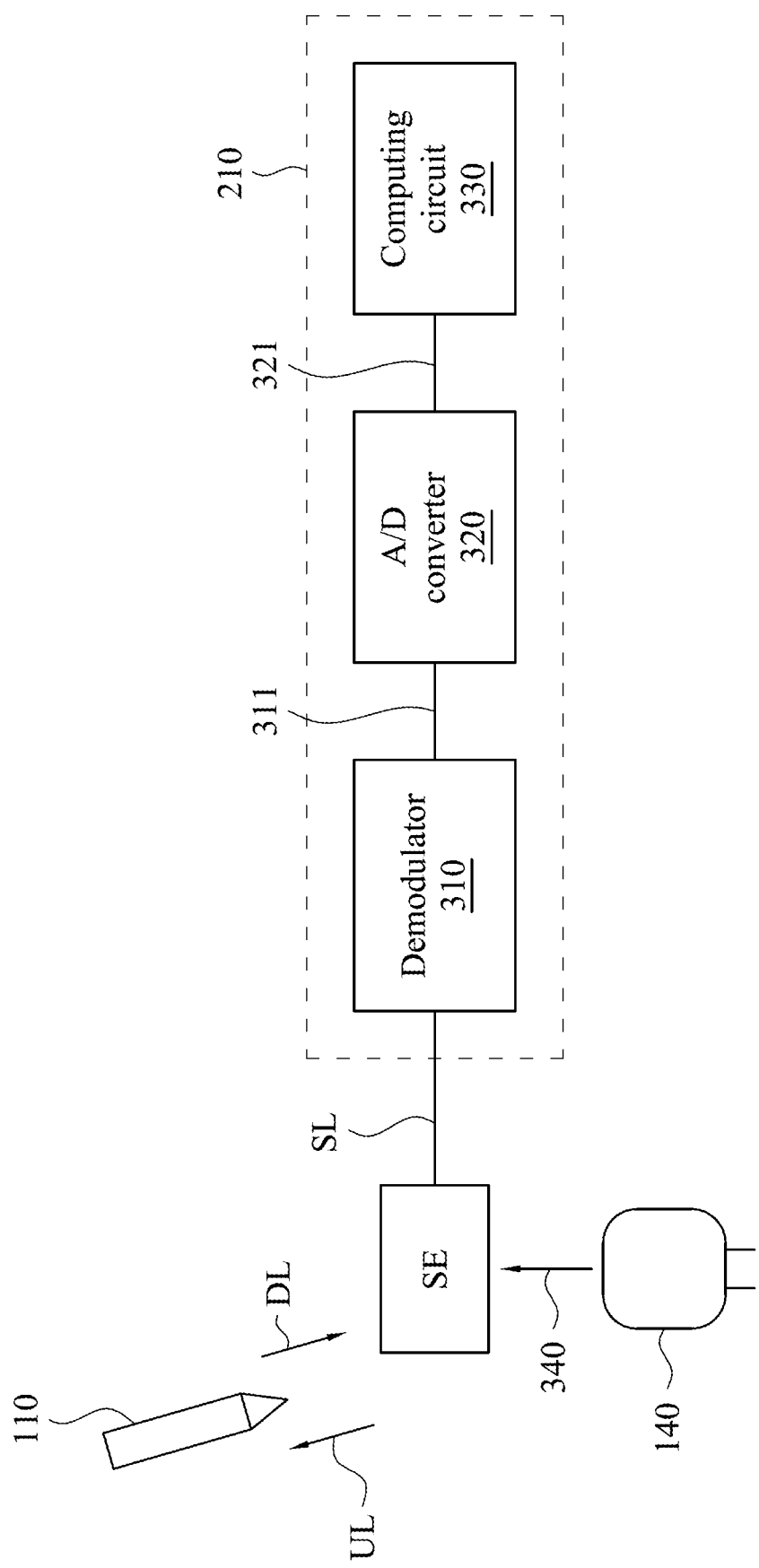
FIG. 3 is a circuit diagram of the sensing circuit 210 in accordance with an embodiment.

FIG. 3 is a circuit diagram of the sensing circuit 210 in accordance with an embodiment. Referring to FIG. 3, the sensing circuit 210 at least includes a demodulator 310, an analogy-to-digital (ND) converter 320, and a computing circuit 330. The demodulator 310 is electrically connected to the sensing electrodes SE through the sensing lines SL. The analogy-to-digital converter 320 is electrically connected to the demodulator 310, and the computing circuit 330 is electrically connected to the analogy-to-digital converter 320. Not all units of the sensing circuit 210 are illustrated in FIG. 3 for simplification. For example, a multiplexer and an integrator may be disposed between the demodulator 310 and the sensing electrodes SE.

In a stylus detection period, the sensing circuit 210 transmits the uplink signal UL to the sensing electrodes SE, and the uplink signal UL is transmitted to the active stylus 110 through the sensing electrodes SE. When receiving the uplink signal UL, the active stylus 110 transmits the downlink signal DL to the sensing electrodes SE. The downlink signal DL is modulated on a carrier at a particular frequency (e.g. 285 k Hz), and therefore the demodulator 310 has to perform the demodulation to the signals on sensing lines SL to output demodulated signals 311. The analogy-to-digital converter outputs digital signals 321 according to the demodulated signals 311. The digital signals 321 represent a stylus value of the corresponding sensing electrode SE. The greater the stylus value is, the greater the magnitude of the downlink signal DL is. The computing circuit 330 determines if the stylus values are greater than a first threshold, and determines that the downlink signal is detected if the determination result is affirmative. If all of the stylus values are less than the first threshold, it means the downlink signal is not detected. The computing circuit 330 also determines a stylus position based on the stylus values. For example, a weighting sum of the positions of the sensing electrodes SE is calculated as the stylus position in which the weight of each sensing electrode SE is proportional to the corresponding stylus value. However, how the stylus position is calculated is not limited in the disclosure.

A noise 340 generated by the charger 140 may be transmitted to the sensing electrodes SE. If the frequency of the noise is similar or identical to that of the downlink signal DL, then the corresponding stylus value may be greater than the first threshold, resulting in a falsely detection. In the embodiments, when detecting the downlink signal, the computing circuit 330 further determines if a distance between the stylus position and the touch position is less than or equal to a predetermined distance. If the distance between the stylus position and the touch position is greater than the predetermined distance, the sensing circuit 210 enters a stylus mode in which the touch position is not detected. In some embodiments, "the touch position is not detected" means not transmitting the aforementioned touch sensing signal, but it may also represent that the touch sensing signal is transmitted but the operation of the touch position is not performed in other embodiments. On the other hand, if the distance between the stylus position and the touch position is less than or equal to the predetermined distance, it means that the stylus position may be generated by the noise, and therefore it may not enter the stylus mode. Two mechanisms are provided to determine whether to enter the stylus mode which will be described with reference of FIG. 4 and FIG. 5.

Figure 4:
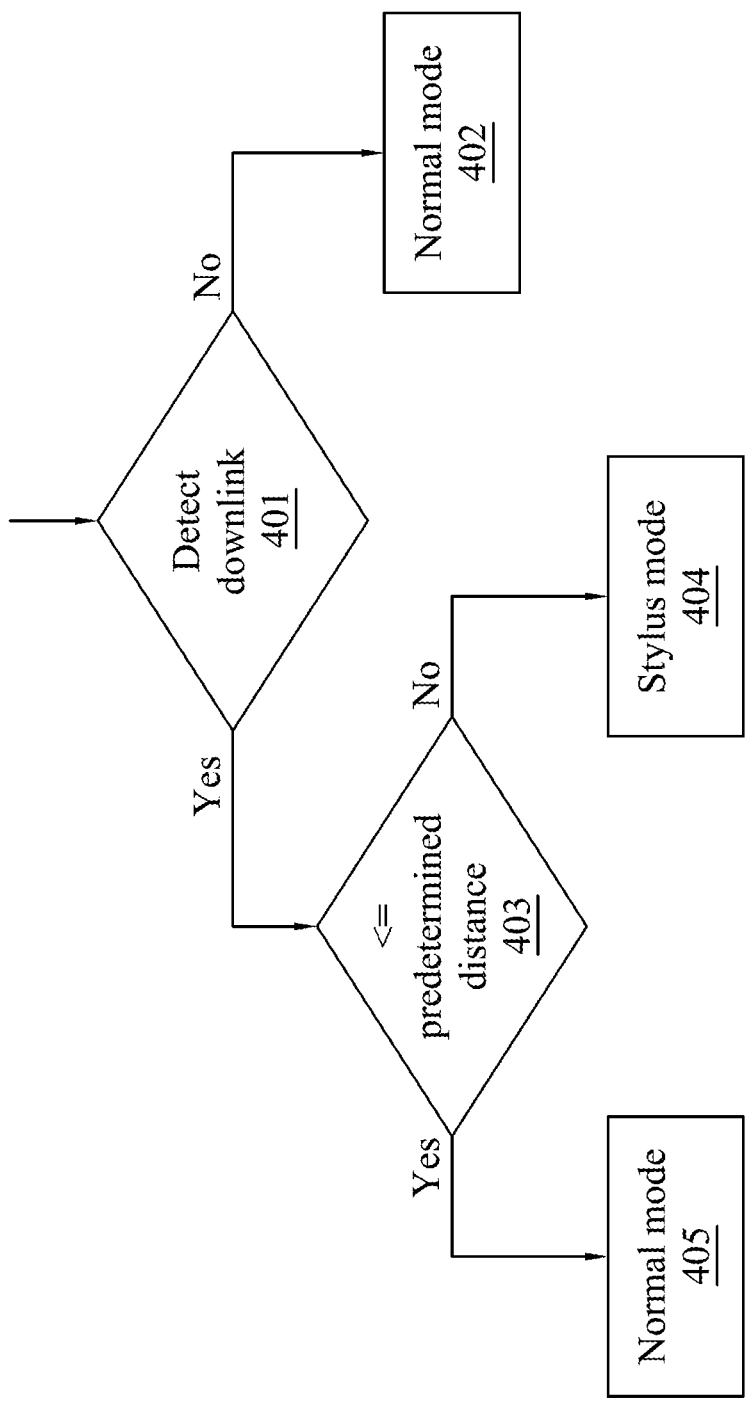
FIG. 4 is a flow chart of determining whether to enter the stylus mode in accordance with an embodiment.

FIG. 4 is a flow chart of determining whether to enter the stylus mode in accordance with an embodiment. In step 401, it is determine whether the downlink signal is detected (i.e. at least one stylus value is greater than the first threshold). A step 402 is performed to stay in the normal mode if the determination result of the step 401 is "no". If the downlink signal is detected, in step 403, it is determine if the distance between the stylus position and the touch position is less than or equal to the predetermined distance. The step 404 is performed to enter the stylus mode if the result of the step 403 is "no", and otherwise step 405 is performed to ignore the downlink signal and stay in the normal mode (i.e. not entering the stylus mode). In some embodiments, the predetermined distance may be zero, and that is, it stays in the normal mode if the stylus position is the same as the touch position.

Figure 5:
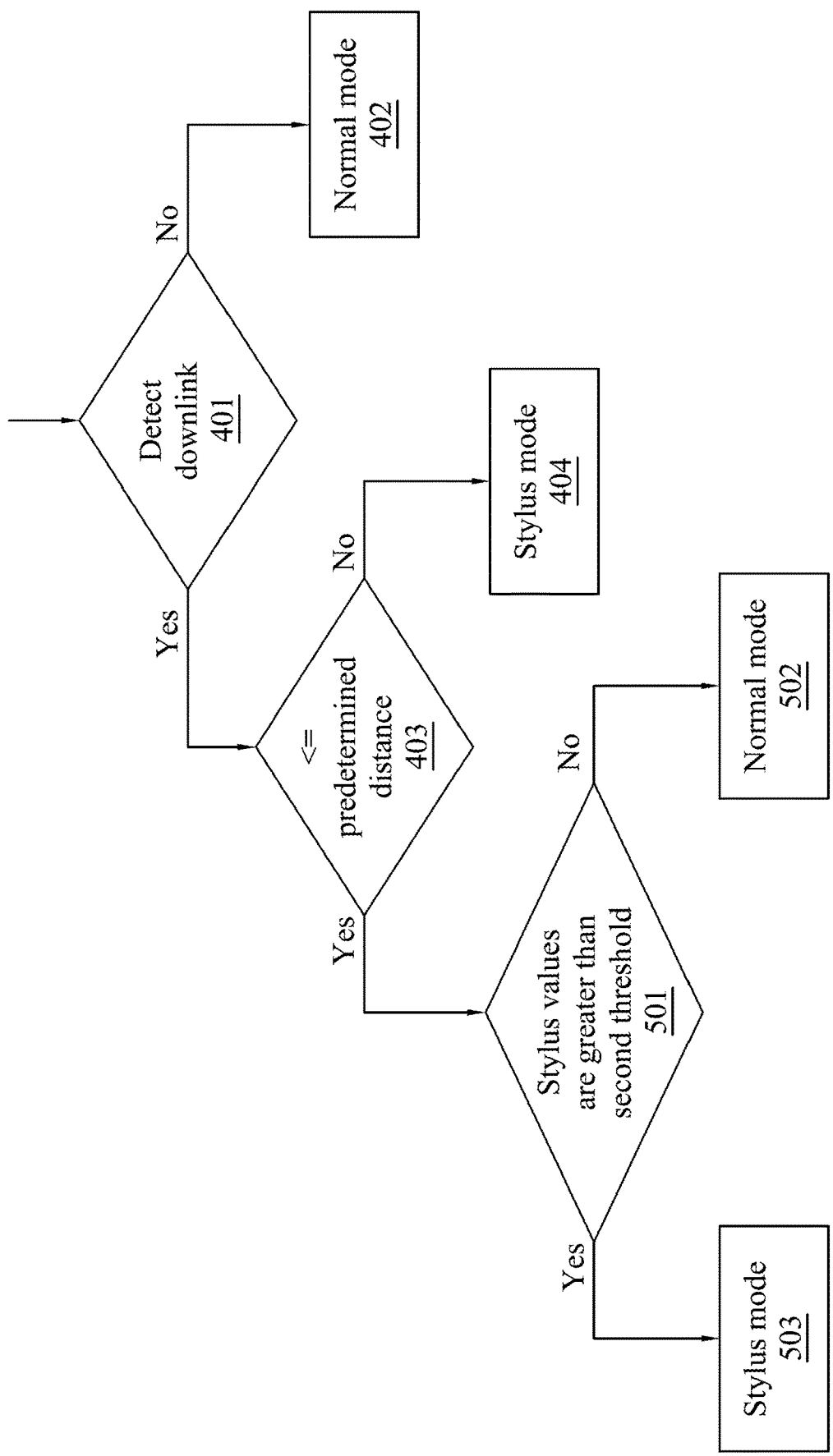
FIG. 5 is a flow chart of determining whether to enter the stylus mode in accordance with an embodiment.

FIG. 5 is a flow chart of determining whether to enter the stylus mode in accordance with an embodiment. The steps 401-404 has been described above, and the therefore the description thereof will not be repeated. When the result of the step 403 is "yes", the step 501 is performed to determine if the stylus values are greater than a second threshold which is greater than the first threshold. If the result of the step 501 is "no", in step 502, the downlink signal is ignored and it stays in the normal mode. If the result of the step 501 is "yes", in step 503, it enters the stylus mode. In other words, the threshold for the stylus values is increased in the embodiment of FIG. 5 so as to reduce the possibility of the false detection. In some embodiments, if the stylus position is the same as the touch position, then it stays in the normal mode no matter the stylus values are greater than the second threshold or not.

Figure 6:
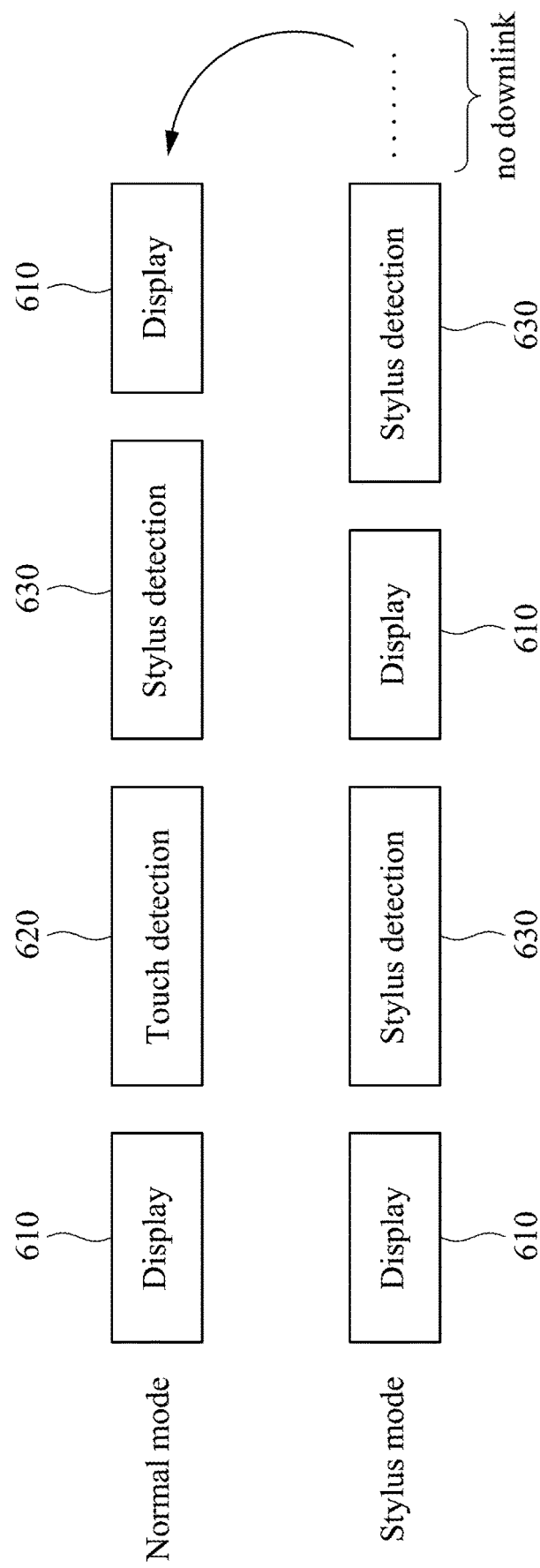
FIG. 6 is a diagram of switching between the normal mode and the stylus mode in accordance with an embodiment.

FIG. 6 is a diagram of switching between the normal mode and the stylus mode in accordance with an embodiment. Referring to FIG. 6, in the normal mode, a display period 610, a touch detection period 620, and a stylus detection period 630 are performed repeatedly. However, in the stylus mode, only the display period 610 and the stylus detection period 630 are performed alternatively. If the downlink signal is not detected for a predetermined time (e.g. time of several frames), then the stylus mode is ended and it goes back to the normal mode to re-detect the touch position.

Although the present invention has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A touch-and-display device operated with an active stylus, the touch-and-display device comprising:
   a touch-and-display panel comprising a plurality of sensing electrodes; and
   a circuit electrically connected to the sensing electrodes through a plurality of sensing lines,
      wherein in a touch detection period, the circuit is configured to detect a touch position according to a plurality of first signals on the sensing lines,
      wherein in a stylus detection period, the circuit is configured to transmit an uplink signal to the sensing electrodes and detect a downlink signal and a stylus position according to a plurality of second signals on the sensing lines, wherein when the downlink signal is detected, the circuit is configured to determine if a distance between the stylus position and the touch position is less than or equal to a first predetermined distance, wherein if the distance between the stylus position and the touch position is greater than the first predetermined distance, the circuit is configured to enter a stylus mode, wherein the touch position is not detected in the stylus mode, wherein if the distance between the stylus position and the touch position is less than or equal to the first predetermined distance, the circuit is configured not to enter the stylus mode.

2. The touch-and-display device of claim 1, wherein the circuit comprises:

a demodulator electrically connected to the sensing lines and configured to output a plurality of demodulated signals according to the second signals;

an analogy-to-digital converter electrically connected the demodulator and configured to output a stylus value corresponding to each of the sensing electrodes according to the demodulated signals; and a computing circuit electrically connected to the analogy-to-digital converter and configured to calculate the stylus position according to the stylus values and determine if the stylus values are greater than a first threshold, wherein if one of the stylus values is greater than the first threshold, the computing circuit is configured to determine that the downlink signal is detected.

3. The touch-and-display device of claim 2, wherein the computing circuit is configured to calculate a weighting sum of positions of the sensing electrodes as the stylus position, and a weight of each of the sensing electrodes is proportional to the corresponding stylus.

4. The touch-and-display device of claim 2, wherein if the distance between the stylus position and the touch position is less than or equal to the first predetermined distance, the circuit is configured to determine if the stylus values are greater than a second threshold which is greater than the first threshold, wherein if the stylus values are less than or equal to the second threshold, the circuit is configured to ignore the downlink signal and not enter the stylus mode.

5. The touch-and-display device of claim 4, wherein if one of the stylus values is greater than the second threshold, the circuit is configured to enter the stylus mode.

6. The touch-and-display device of claim 4, wherein if the stylus position is same as the touch position, the circuit is configured not to enter the stylus mode.

7. The touch-and-display device of claim 1, wherein if the downlink signal is not detected for a predetermined time, the circuit is configured to end the stylus mode and re-detect the touch position.

8. The touch-and-display device of claim 1, wherein the touch-and-display device is connected to a charger.

9. A sensing method of an active stylus for a touch-and-display device which comprises a plurality of sensing electrodes, wherein a plurality of sensing lines are connected to the sensing electrodes respectively, and the sensing method comprises:

in a touch detection period, detecting a touch position according to a plurality of first signals on the sensing lines;

in a stylus detection period, transmitting an uplink signal to the sensing electrodes and detecting a downlink signal and a stylus position according to a plurality of second signals on the sensing lines;

when the downlink signal is detected, determining if a distance between the stylus position and the touch position is less than or equal to a first predetermined distance;

if the distance between the stylus position and the touch position is greater than the first predetermined distance, entering a stylus mode, wherein the touch position is not detected in the stylus mode; and if the distance between the stylus position and the touch position is less than or equal to the first predetermined distance, not entering the stylus mode.

10. The sensing method of claim 9, further comprising:

outputting, by a demodulator, a plurality of demodulated signals according to the second signals;

outputting, by an analogy-to-digital converter, a stylus value corresponding to each of the sensing electrode according to the demodulated signals;

calculating the stylus position according to the stylus values and determining if the stylus values are greater than a first threshold; and if one of the stylus values is greater than the first threshold, determining that the downlink signal is detected.

11. The sensing method of claim 10, further comprising:

calculate a weighting sum of positions of the sensing electrodes as the stylus position, wherein a weight of each of the sensing electrodes is proportional to the corresponding stylus value.

12. The sensing method of claim 10, further comprising:

if the distance between the stylus position and the touch position is less than or equal to the first predetermined distance, determining if the stylus values are greater than a second threshold which is greater than the first threshold; and if the stylus values are less than or equal to the second threshold, ignoring the downlink signal and not entering the stylus mode.

13. The sensing method of claim 12, further comprising:

if one of the stylus values is greater than the second threshold, entering the stylus mode.

14. The sensing method of claim 12, further comprising:

if the stylus position is same as the touch position, not entering the stylus mode.

15. The sensing method of claim 9, further comprising:

if the downlink signal is not detected for a predetermined time, ending the stylus mode and re-detecting the touch position.

* * * * *